United States Statutory Invention Registration [19]

[11] Reg. Number: H469

Deak [43] Published: May 3, 1988

[54] CLEAR PLASTIC CONTAINER WITH GOOD GAS AND WATER VAPOR BARRIER PROPERTIES

[76] Inventor: Gedeon I. Deak, 14 Ravine Rd., Wilmington, Del. 19810

[21] Appl. No.: 928,948

[22] Filed: Nov. 4, 1986

[51] Int. Cl.[4] ..... B32B 27/08

[52] U.S. Cl. ..... 428/35; 428/476.3; 428/474.4; 426/127; 215/1 C

[58] Field of Search ..... 426/127; 428/35, 475.8, 428/476.1, 476.3, 476.9; 215/1 C

[56] References Cited

U.S. PATENT DOCUMENTS

| | | | |
|---|---|---|---|
| 4,058,647 | 11/1977 | Inoue | 428/476.1 |
| 4,104,404 | 8/1978 | Bieder et al. | 428/476.9 |
| 4,182,457 | 1/1980 | Yamada et al. | 215/1 C |
| 4,217,161 | 8/1980 | Yamada et al. | 156/242 |
| 4,431,705 | 2/1984 | Kitagawa et al. | 428/476.1 |
| 4,486,507 | 12/1984 | Schumacher | 428/476.1 |
| 4,617,240 | 10/1986 | Krueger et al. | 428/476.1 |
| 4,654,240 | 3/1987 | Johnston | 428/ |
| 4,668,571 | 5/1987 | Moriarty, JR. | 428/476.9 |

FOREIGN PATENT DOCUMENTS

| | | |
|---|---|---|
| 996018 | 8/1976 | Canada . |
| 2208778 | 8/1974 | France . |
| 51-116868 | 10/1976 | Japan . |
| 54-006678 | 1/1979 | Japan . |
| 54-006679 | 1/1979 | Japan . |
| 55-071242 | 5/1980 | Japan . |
| 55-139228 | 10/1980 | Japan . |
| 56-167442 | 12/1981 | Japan . |
| 57-195653 | 12/1982 | Japan . |
| 61-118142 | 8/1986 | Japan . |

*Primary Examiner*—John F. Terapane
*Assistant Examiner*—Susan Wolffe

[57] ABSTRACT

A container having a multi-layer structure comprising a plurality of thermoplastic resins, wherein at least one layer of the container comprises one or more amorphous polyamides and at least one of the remaining layers comprises an oriented Thermoplastic resin.

19 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLEAR PLASTIC CONTAINER WITH GOOD GAS AND WATER VAPOR BARRIER PROPERTIES

BACKGROUND OF THE INVENTION

This invention relates to multilayer containers having at least one layer of an amorphous polyamide polymer and at least one other layer of an orienting thermoplastic resin.

Containers with good gas barrier properties are needed for the packaging of perishable foods, drinks, for pharmaceuticals, cosmetics and other chemicals containing volatile substances. It is a clear advantage if that packaging is transparent, with low haze, so that the content of the package is clearly visible. Many of the barrier materials currently in use, aluminum foil, ethylene vinyl alcohol copolymers, polyvinylidenechloride and acrylonitrile copolymers are all either opaque or can be quite hazy when formed by extrusion or coextrusion.

SUMMARY OF THE INVENTION

This invention relates to a container having a multilayer structure which comprises a plurality of thermoplastic resins, wherein at least one layer of the container is composed of one or more amorphous, glassy, noncrystalline polyamides and at least one of the remaining layers comprises an orienting thermoplastic resin. These containers have excellent gas and water-vapor barrier properties and outstanding optical qualities, such as low haze. Preferably, the multi-layer structure of the container of this invention also incorporates at least one layer interposed between the amorphous nylon layer and the orienting thermoplastic resin, said layer being composed of a resin having an adhesion to both the amorphous nylon and the orienting thermoplastic resin.

DETAILED DESCRIPTION OF THE INVENTION

The amorphous polyamides useful in this invention are those which are lacking in crystallinity as shown by the lack of an endotherm crystalline melting peak in a Differential Scanning Calorimeter test (ASTM D3417) and whose glass transition temperatures are above the about 50 degrees C. Examples of diamines which can be used to prepare the amorphous polyamides are: hexamethylenediamine, 2,2,4-trimethyl hexamethylene diamine, 2,4,4-trimethyl hexamethylenediamine, 2-methyl pentamethylene diamine, bis-(4-aminocyclohexyl)-methane, 2,2- bis(4-aminocyclohexyl)-isopropylidene, 1,4-(1,3)-diamino cyclohexane, m-xylylene diamine, 1,5-diaminopentane, 1,4-diaminobutane, 1,3-diaminopropane, 2-ethyl diaminobutane, 1,4-aminomethyl cyclohexane, p-xylylene diamine, meta- and para-phenylene diamine, and alkyl substituted m,p-phenylenediamine. Examples of dicarboxylic acids which can be used to prepare the amorphous polyamides are: isophthalic acid, terephthalic acid, alkyl substituted iso- or terephthalic acid, adipic acid, sebacic acid, and succinic dicarboxylic acid.

Specific examples of polyamides which can be used in the containers of this invention include: hexamethylenediamine isophthalamide, hexamethylenediamine iso/-terephthalamide, m-xylylenediamine adipamide, and mixtures of 2,2,4- and 2,4,4-trimethyl hexamethylenediamine terephthalamide, copolymers of hexamethylene diamine with iso- and tere-phthalic acids. Preferred are the hexamethylenediamine iso/terephthalamides with ratios of iso- to tere- in the range of about 60/40 to 100/0. Most preferred are such polymers with ratios of isoto tere- of about 70/30. Small amounts (0 to 5 mole % based on diamine) of 4,4-bis(aminocyclohexyl)methane may be incorporated in the polyamide. Other additives such as slip additives and thermal stabilizers may also be used.

The orienting thermoplastic resin useful in this invention can be any known thermoplastic resin capable of being oriented by drawing. For example, homopolymers of olefins represented by the formula:

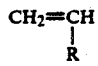

where R stands for a hydrogen atom or an alkyl group having up to 4 carbon atoms, such as ethylene, propylene, butene-1, pentene-1 and 4-methylpentene-1, copolymers of these olefins, copolymers of these olefins with a small amount, generally 0.05 to 10% by weight based on the olefin, of other ethylenically unsaturated monomer such as vinyl acetate, an acrylic acid ester or the like, and blends of two or more of the foregoing polymers can be used in this invention, so far as they are crystalline. As the olefin homopolymer or copolymer, crystalline polypropylene is most preferred in view of the transparency and mechanical properties. Other preferred orienting resins include ethylenepropylene copolymer, high density polyethylene, poly-4-methylpentene-1, polybutene-1 and medium density polyethylene. As the ethylenepropylene copolymer, a crystalline polymer comprising 0.5 to 15 mole % of ethylene and 85 to 95.5 mole % of propylene is especially valuable.

Other examples of suitable orienting thermoplastic resins include polyvinyl chloride, polyethylene terephthalate and ionomers.

In this invention, in general, it is preferred that an adhesive resin having adhesion to both the amorphous polyamide and the orienting thermoplastic resin layer be interposed between those two layers.

Any of the known resins having an adhesion to the above-mentioned amorphous polyamide and the orienting thermoplastic resin can be used as the adhesive resin. In general, however, as the adhesive polymer there are employed thermoplastic polymers having carbonyl groups derived from functional groups of free carboxylic acids, carboxylic acid salts, carboxylic acid esters, carboxylic acid amides, carboxylic anhydrides, carbonic acid esters, urethanes, ureas or the like. In these thermoplastic polymers, the carbonyl group concentration may be changed in a broad range, but in general, it is preferred to use a thermoplastic polymer containing carbonyl groups at a concentration of 10 to 1400 millimoles per 100 g of the of the polymer, especially 30 to 1200 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, low density polyethylene and ethylene-vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides and imides of the acids described above. U.S. Pat. No. 4,230,830, the disclosure of which is hereby incorporated by reference, discloses resins particularly suitable for use with nylons. In addition, as the adhesive resin, there can be used ethylene-acrylate copolymers, ionomers (such as Surlyn(R) manufactured by E. I. du Pont de Nemours and Company, Wilmington, Del.), polyalkylene oxide-polyester block copolymers, carboxylmethyl cellulose derivatives, and blends of these polymers with polyolefins.

The containers of this invention have a minimum of two layers, one being the amorphous polyamide and one being the orienting thermoplastic resin. Preferably, the containers have a third layer consisting of the above-mentioned adhesive resin. The containers may also have five or more layers, two outer layers of the orienting thermoplastic resin, an inner layer of the amorphous polyamide, and two or more layers of adhesive resin, and other inner thermoplastic resin layers as desired.

The containers of this invention may be made by processes well known in the art which are capable of orienting the layer of orienting thermoplastic resin. Such known processes include thermoforming by solid phase forming, forging, coextrusion blow-molding and stretch blow-molding, coinjection blow-molding, tube coextrusion followed by stretching for container bodies, and tube or pipe coextrusion for stretch blow-mold preforms. The containers are useful for packaging of foods, drinks, pharmaceuticals, cosmetics and other perishable or volatile materials.

The invention is illustrated by the following examples.

EXAMPLE 1

A five-layer sheet was coextruded, using three extruders, a combining adapter, and a 35 cm-wide single-manifold sheeting die. Both surface layers, 0.55 mm-thick each, were polypropylene homopolymers with a melt flow index of 4 (measured by ASTM 1238, standard condition L). The core layer, 0.15 mm thick, was an amorphous polyamide: a condensation polymer of 1,6 diamino hexane with a 70/30 mixture of isophthalic and terephthalic acids, with 3.5 mole % of 4,4-bis-(aminocyclohexyl)methane. Between the core layer and the surface layers, there were 0.05 mm-thick adhesive layers, which consisted of a blend of maleic anhydride grafted ethylene-polypropylene copolymer in an ethylene vinyl acetate copolymer matrix. The polypropylene homopolymer was extruded with a 38 mm diameter single-screw extruder, running at 80 rpm, with a melt temperature of 240 deg. C. The amorphous nylon was extruded from a 25 mm-diameter single-screw extruder, equipped with a grooved feed barrel, running at 25 rpm, and with a melt temperature of 235 deg C. The adhesive layers were extruded with 32 mm-diameter single-screw extruder, running at 14 rpm and a melt temperature of 230 deg C. The extruded sheet was cooled on a chill-roll stack of three rolls, the first roll 6-inch diameter, second and third rolls 12-inch diameter. These rolls were cooled with hot water having a temperature of about 65 deg C. (hereinafter referred to as the "quench temperature"). The total thicknesses of the finished sheeting were in the 1.30 mm to 1.50 mm range.

The sheet described above was thermoformed on an Illig RDM37/10 machine using ceramic sheet heaters (from both sides) operating at 320 to 380 deg C. temperature resulting in a sheet temperature of 154 to 164 deg C., air pressure of 600 kPa.; plug assist; and molding rates of 10 to 14 cycles/min. The shape and size of the mold and finished containers were a cylindrical can shape, 83 mm diameter, and 93 mm deep, with a 3.5 mm-wide flange. The mold was maintained at 15 deg C. temperature with cooling water.

Using the test method of ASTM D1003, the haze of the multi-layer container wall with the amorphous polyamide core was determined to be 8.9%.

EXAMPLE 2

Using the equipment and process described in Example 1, several five-layer and mono-layer sheets were made for thermoforming. The amorphous polyamide used in Samples A and B was a condensation polymer of 1,6-diamino hexane with a mixture of isophthalic (I) and terephthalic (T) acids as indicated in Table 1. Layers of the adhesive resin used in Example 1 were interposed between the outer layers of polypropylene and the core layer of amorphous polyamide. Subsequently, all of these sheets were thermoformed, using the equipment and conditions described in Example 1, except that the mold, and consequently, the containers in Example 2 were can-shaped, having diameters of 67 mm and depths of 68 mm, with a flange outer diameter of 70 mm. The materials of these samples, the quench temperature used in extruding them into sheets, and the haze values of the sidewalls of the containers made from these materials (measured as described in Example 1) are shown in Table 1.

TABLE 1

| Sample | No. of Layers | Core Layer | Surface Layer | Quench Temp.* | Haze % |
|---|---|---|---|---|---|
| A | 5 | Polyamide[1] | PP[2] | 88 | 9.6 |
| B | 1 | — | " | 90 | 14.1 |
| C | 5 | Polyamide[3] | PP[4] | 90 | 16.0 |
| D | 1 | — | " | 94 | 17.0 |
| E | 1 | — | PP[5] | 94 | 78.9 |

[1]6I/6T 70/30
[2]Himont PF101 polypropylene (Hercules, Inc., Wilmington, Delaware)
[3]6I/6T 70/30 + 3.5% 4,4-bis(aminocyclohexyl)methane
[4]Shell 5524 polypropylene (Shell Chemical Company)
[5]Himont PD064 polypropylene (Hercules, Inc.)
*Degrees C

EXAMPLE 3

Using the same equipment and process described in Example 1, 5- and 3-layer sheets were made. The polyamides used were identical to those described above in Table 1, and the adhesive materials used were identical to those used in Example 1. These sheets were thermoformed along with some commercially made sheets, using a mold to make can-shaped containers, 67 mm diameter, 102 mm deep, with a flange diameter of 70 mm. The materials of these samples, the quench temperatures used in the extrusion process and the haze values of the sidewalls of the containers made from the materials are given in Table 2. These data indicate that the quenching temperature can have an important effect on the optical qualities of containers made from coextruding and thermoforming samples of polypropylene/amorphous nylon. A quench temperature of about 65 to 70 degrees C. appears to be optimal.

TABLE 2

| Sample | No. of Layers | Core Layer | Surface Layer | Quench Temp.* | Haze % |
|---|---|---|---|---|---|
| F | 5 | Polyamide[1] | PP[4] | 65 | 11.0 |
| G | 1 | — | PP[4] | 70 | 7.7 |

TABLE 2-continued

| Sample | No. of Layers | Core Layer | Surface Layer | Quench Temp.* | Haze % |
|---|---|---|---|---|---|
| H | 3** | Polyamide[3] | PP[5] | 94 | 9.2 |
| I | 1 | — | PP[5] | 90 | 57.5 |
| J | 5 | EVOH | PP[5] | 95 | 53.2 |
| K | 5 | PVDC | PP[6] | — | 34.2 |

Subscripts 1-5 same as Table 1
[6]Unknown polypropylene
*Degrees C
**The polyamide is the outside surface layer

What is claimed is:

1. A container having a multi-layer structure comprising a plurality of thermoplastic resins, wherein at least one layer of the container comprises one or more amorphous polyamides and at least one of the remaining layers comprises an oriented thermoplastic resin.

2. A container according to claim 1 where a layer of resin having an adhesion to both the amorphous polyamide and the orienting thermoplastic resin is interposed between said layers of amorphous polyamide and oriented thermoplastic resin.

3. A container according to claim 2 which has three layers, a first layer of oriented thermoplastic resin, a second layer of amorphous polyamide and, interposed therebetween, a third layer of resin having an adhesion to both of said first and second layers.

4. A container according to claim 2 which has five layers, two outer layers of oriented thermoplastic resin, a core layer of amorphous polyamide and, interposed between said core layer and each of said outer layers, layers of resin having an adhesion to both of said core and outer layers.

5. A container according to claim 1 where the oriented thermoplastic resin is polypropyene.

6. A container according to claim 2 where the oriented thermoplastic resin is polypropylene.

7. A container according to claim 1 where the amorphous polyamide is a copolymer of hexamethylene diamine and either isophthalic acid or a mixture of isophthalic and terephthalic acids.

8. A container according to claim 7 where the isophthalic and terephthalic acids are present in a molar ratio of between about 60:40 to 100:0.

9. A container according to claim 8 where the isophthalic and terephthalic acids are present in a molar ratio of about 70:30.

10. A container according to claim 2 where the amorphous polyamide is a copolymer of hexamethylene diamine and either isophthalic acid or a mixture of isophthalic and terephthalic acids.

11. A container according to claim 10 where the isophthalic and terephthalic acids are present in a molar ratio of between about 60:40 to 1100:0.

12. A container according to claim 11 where the isophthalic and terephthalic acids are present in a molar ratio of about 70:30.

13. A container according to claim 5 where the amorphous polyamide is a copolymer of hexamethylene diamine and either isophthalic acid or a mixture of isophthalic and terephthalic acids.

14. A container according to claim 13 where the isophthalic and terephthalic acids are present in a molar ratio of between about 60:40 to 100:0.

15. A container according to claim 14 where the isophthalic and terephthalic acids are present in a molar ratio of about 70:30.

16. A container according to claim 6 where the amorphous polyamide is a copolymer of hexamethylene diamine and either isophthalic acid or a mixture of isophthalic and terephthalic acids.

17. A container according to claim 16 where the isophthalic and terephthalic acids are present in a molar ratio of between about 60:40 to 100:0.

18. A container according to claim 17 where the isophthalic and terephthalic acids are present in a molar ratio of about 70:30.

19. A container according to claim 2 where the adhesive resin is a blend of maleic anhydride-grafted ethylene-propylene copolymer in an ethylene vinyl acetate copolymer.

* * * * *